C. A. ERDLEY.
PATCH HOLDER.
APPLICATION FILED AUG. 6, 1919.

1,352,799.

Patented Sept. 14, 1920.

WITNESSES

INVENTOR
Clarence H. Erdley.
BY
ATTORNEYS

UNITED STATES PATENT OFFICE.

CLARENCE ALBERT ERDLEY, OF MIFFLINBURG, PENNSYLVANIA.

PATCH-HOLDER.

1,352,799. Specification of Letters Patent. Patented Sept. 14, 1920.

Application filed August 6, 1919. Serial No. 315,711.

*To all whom it may concern:*

Be it known that I, CLARENCE A. ERDLEY, a citizen of the United States, and a resident of Mifflinburg, in the county of Union and State of Pennsylvania, have invented certain new and useful Improvements in Patch-Holders, of which the following is a specification.

My invention is an improvement in patch holders, and the invention has for its object to provide a holder of the character specified for holding blow-out patches used in repairing blow-outs in pneumatic tires.

Figure 1:
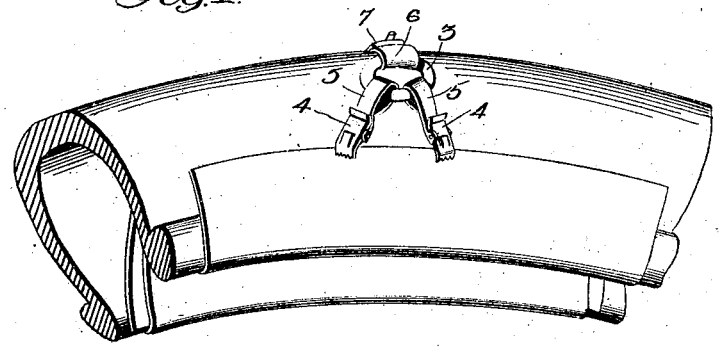
Figure 1 is a perspective view showing the holder in use.
Figure 2:
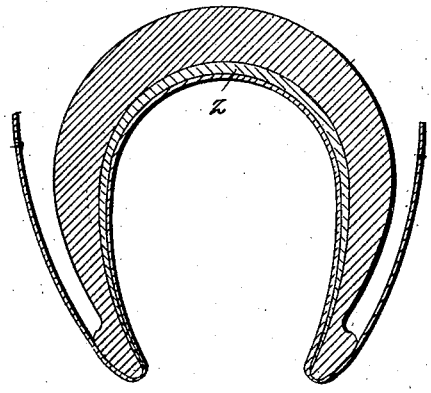
Fig. 2 is a radial section through the tire, with the patch in place.
Figure 3:
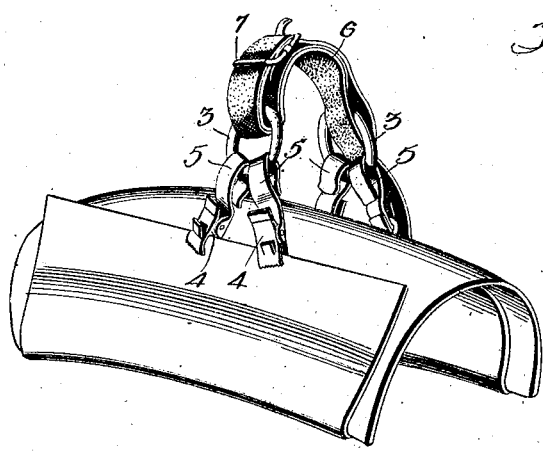
Fig. 3 is a perspective view of the patch holder connected to the patch, removed from the tire.

The present embodiment of the invention is shown in connection with the shoe or casing 1 of a pneumatic tire, and in connection with a patch 2 of usual construction, used in repairing blow-outs in the tire.

The improvement comprises a pair of rings 3, each of which supports two spring controlled clasps or snap fasteners 4 which are connected to the rings by hooks 5. As shown, each snap hook consists of a lower member carrying the hook 5 and an upper member pivoted thereto, and the two members have coöperating jaws provided with teeth for gripping the patch. Springs (not shown) are provided for forcing the jaws together. The rings 3 are connected by a doubled strap 6. This strap is formed into a loop, engaging both rings, the ends of the strap being connected by a buckle 7 of usual form.

In use, the patch is inserted in the tire as shown in Fig. 1, and the ends are grasped by the clasps. Thus the flaps are held so that they will not slip into the casing while putting the casing on the rim. After the blowout patch has been placed, the holder is unsnapped and removed. The clasps, it will be noticed, slide evenly on the ring holders and pull evenly on the blow-out patches. Mounting them on the rings, they are free to position themselves in accordance with the strain.

I claim:

A device for holding an inside blow-out patch within a tire while the tire is being placed upon a rim, the blow-out patch including flaps passing beneath the beads of the tire; comprising clasps engageable with the flaps of the patch, and a member connecting the clasps and adjustable whereby to be drawn snugly against the outer periphery of the tire to hold the flaps firmly against the sides of the tire whereby to prevent folding of the flaps into the tire or shifting of the patch.

CLARENCE ALBERT ERDLEY.

Witness:
JOHN A. BEARD.